United States Patent [19]

Straus

[11] 3,829,814

[45] Aug. 13, 1974

[54] LOGGING CABLE CONNECTOR

[75] Inventor: Andrew J. D. Straus, Dallas, Tex.

[73] Assignee: Mobil Oil Corporation, New York, N.Y.

[22] Filed: Dec. 22, 1972

[21] Appl. No.: 317,846

[52] U.S. Cl. .............................. 339/14 R, 339/183
[51] Int. Cl. .............................................. H01r 3/06
[58] Field of Search....... 339/14 R, 14 P, 14 L, 182, 339/183, 188 C

[56] References Cited
UNITED STATES PATENTS

| | | | |
|---|---|---|---|
| 2,170,131 | 8/1939 | Doremus | 339/14 P |
| 3,060,417 | 10/1962 | Blake | 339/182 R |
| 3,193,636 | 7/1965 | Daniels | 339/182 R X |
| 3,289,149 | 11/1966 | Pawloski | 339/183 |
| 3,626,360 | 12/1971 | Cole | 339/183 |
| 3,636,494 | 1/1972 | Smith | 339/14 R |
| 3,641,479 | 2/1972 | O'Brien et al. | 339/182 R |
| 3,644,867 | 2/1972 | Krause | 339/14 R |
| 3,725,840 | 4/1973 | Hesse | 339/14 R |
| 3,753,206 | 8/1973 | Busuttil et al. | 339/183 |

FOREIGN PATENTS OR APPLICATIONS 1,178,366   12/1958   France ......................... 339/188 C Primary Examiner—Bobby R. Gay
Assistant Examiner—Robert A. Hafer
Attorney, Agent, or Firm—A. L. Gaboriault; George W. Hager, Jr.

[57] ABSTRACT

In a borehole logging tool, a connector is utilized to couple electrical power from a logging cable to the sensitive elements within the borehole tool. The connector includes a male and a female member, the electrical ground conductors on the male and female members being arranged to make contact prior to the electrical power conductors on the male and female members making contact.

4 Claims, 4 Drawing Figures

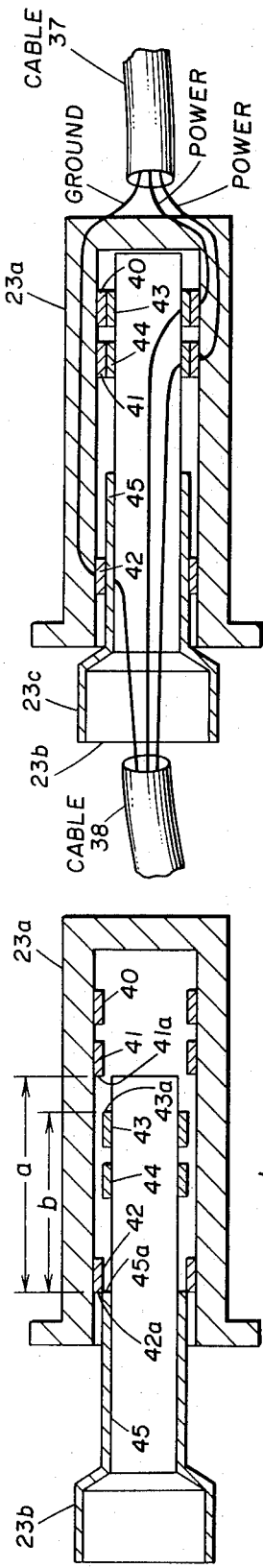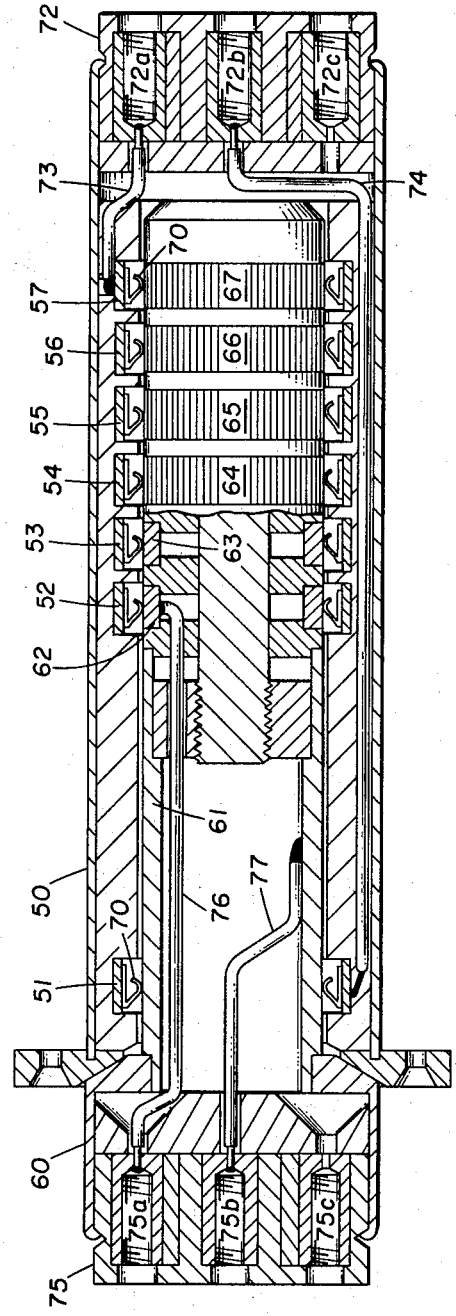
FIG. 2A  FIG. 2B  FIG. 3

LOGGING CABLE CONNECTOR

BACKGROUND OF THE INVENTION

This invention relates to well logging and more particularly to a connector for coupling a logging cable to a borehole tool.

Well logging tools are used extensively in determining various physical properties of subterranean strata penetrated by a borehole. Such properties are determined by lowering a well logging tool, capable of making the desired determination, into the well borehole to the desired strata. The well logging tools are commonly electrically operated and contain sensitive elements which are responsive to the physical properties of the subterranean strata. One such well logging tool is described in my copending U.S. Pat. application Ser. No. 190,027, filed Oct. 18, 1971, relating to APPARATUS FOR COUPLING LOGGING CABLE TO BOREHOLE TOOL. By measurement or recordation of the response of the sensitive element, information as to the physical properties of the subterranean strata is obtained.

A well logging cable extending into the borehole from the surface of the earth supplies the electrical power required by the sensitive elements which are housed within the borehole tool and transmits information from the borehole tool to the surface of the earth.

SUMMARY OF THE INVENTION

When several logging operations are to be performed utilizing different size and type logging tools, the logging operation can be quite time-consuming and therefore costly to the total logging operation if the logging cable is not quickly and easily connected to and disconnected from the borehole tool. Further, it is important to the safety of the operator during the connecting and disconnecting of the logging cable to and from the borehole tool that the connector which electrically couples the logging cable to the sensitive elements within the borehole tool be electrically grounded.

The present invention is, therefore, directed to a connector which includes a first and a second cylindrical member. The second cylindrical member is hollow and has one end open to receive the first member. At least two conductors are affixed to the outer surface of the first member and are separated from each other in the axial direction of the first member. At least two conductors are also affixed to the inner surface of the second member and are separated from each other in the axial direction of the second member so as to be in juxtaposition with the conductors on the first member when the first member is positioned within the second member. Contacts are provided for biasing the juxtaposed conductors into electrical contact. The distance between the leading edges of the two conductors nearest the open end of the second member is greater than the distance between the leading edges of the conductor nearest to and the conductor farthest from the end of the first member adapted for insertion into the open end of the second member. Upon insertion of the first member into the second member, the conductor nearest the open end of the second member makes contact with the respective juxtaposed contact on the first member prior to the making of contact between the remaining juxtaposed conductors on the two members. By utilizing the conductor nearest the open end of the second member and the conductor farthest from the end of the first member adapted for insertion into the second member, as the electrical ground conductors, the electrical ground contact is effected prior to the remaining conductors making contact to effect the electrical power connections.

BRIEF DESCRIPTION OF THE DRAWINGS

FIGS. 2A and 2B are pictorial representations of the connector of the present invention.

FIG. 3 is a cross-sectional view of a connector constructed in accordance with the present invention.

DESCRIPTION OF THE PREFERRED EMBODIMENT

Figure 1:
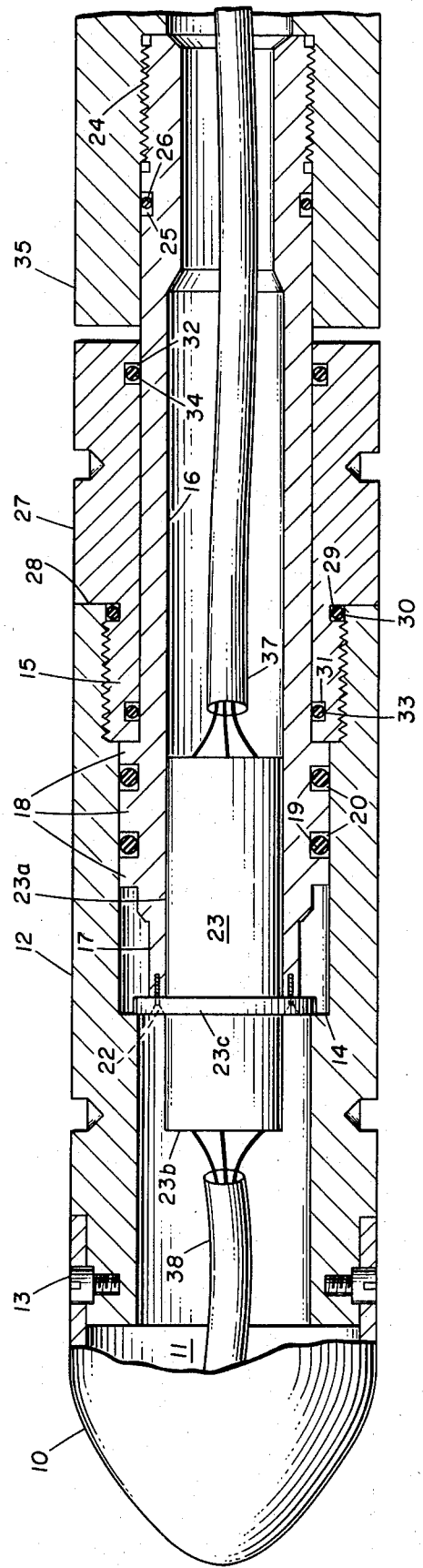
FIG. 1 is a cross-sectional view of a well logging tool with which the connector of the present invention may be utilized.

Before describing in detail the connector of the present invention, there will first be described a borehole logging system with which the connector may preferably be utilized. Referring to FIG. 1, there is illustrated the borehole tool 10.

The borehole tool 10 has a hollow, cylindrical, inner cavity 11 for housing the sensitive logging elements. The tool 10 is affixedly attached to one end of a hollow, cylindrical tool extension 12 by cap screws 13. The other end of said tool extension 12 is bored to provide a shoulder 14. The end portion of the recessed inner wall has threads 15.

Mandrel 16 is generally a hollow cylinder with one end of the outer wall machined to form a hexagonal outer surface 17. The mandrel is machined adjacent the hexagonal end to provide flanges 18 dimensioned to be inserted into tool extension 12. The flanges 18 are separated by circumferential grooves 19 retaining O-rings 20 for sealing the inner chamber of the coupler from borehole liquids and particles. Affixed to the end of mandrel 16 by means of screws 22 is a connector 23. Connector 23 includes a female member 23a and a male member 23b. The female member 23a is flanged at its receptacle face 23c to provide a surface for abuttedly mating against the shoulder 14 of tool extension 12.

The opposite end of mandrel 16 is provided with external threads 24. The outside wall of mandrel 16 immediately adjacent the threads 24 includes a circumferential groove 25 retaining O-ring 26 for sealing the logging tool from borehole liquids and particles.

Rotatable ring 27 has an internal diameter dimensioned to provide mounting over mandrel 16. The outside wall of ring 27 is recessed to provide for a shoulder 28. The recessed outer wall is threaded along much of its length with the same gauge threads as threads 15 of tool extension 12 and has a circumferential groove 29 located adjacent the shoulder 28 for retaining O-ring 30 which engages tool extension 12. The inner surface of ring 27 has two circumferential grooves 31 and 32 for retaining O-rings 33 and 34 which engage mandrel 16. Engagement of ring 27 with tool extension 12 causes ring 27 to be advanced into tool extension 12, with the resulting thrust of the ring 27 against flange 18 advancing mandrel 16 to a point where the connector 23 engages shoulder 14 of tool extension 12.

Cable head 35 is a hollow, cylindrical housing with internal threads at one end of the same gauge as threads 24 on mandrel 16. A shoulder 36 limits the movement of mandrel 16.

A logging cable 37 extends from the cable head 35 through the mandrel 16 and is electrically coupled to the female member 23a of the connector 23. Another cable 38 leading from the sensitive elements of the borehole tool 10 passes through the tool extension 12 and is electrically coupled to the male member 23b of the connector 23.

Having now described a borehole logging system with which the connector of the present invention may be utilized, a detailed description will now be made of the connector itself. In a conventional logging operation, high voltages are applied from the logging cable 37 through the connector 23 to the sensitive elements within the borehole tool. It is an important feature of the connector that the connector itself be properly grounded to prevent electrical shock to an operator connecting and disconnecting the borehole tool from the cable head under circumstances when the high voltages are still being applied to the connector from the logging cable. Referring to FIG. 2A, there is illustrated a pictorial representation of the operation of a connector in accordance with the present invention. The female member 23a is illustrated as a sectional view having three conductors 40, 41, and 42 affixed to its inner surface. These three conductors are electrically connected to the logging cable. For example, conductors 40 and 41 may be supplied with the high-voltage requirements for the borehole tool, while conductor 42 is supplied with electrical ground.

Male member 23b is illustrated as having three conductors 43, 44, and 45 which correspond respectively to conductors 40, 41, and 42. More particularly, when male member 23b is completely inserted into female member 23a, conductors 40 and 43 are in juxtaposition, conductors 41 and 44 are in juxtaposition, and conductors 42 and 45 are likewise in juxtaposition. In this manner, as illustrated in FIG. 2B, electrical power is applied to conductors 43 and 44 and electrical ground is applied to conductor 45. Conductors 43, 44, and 45 are then connected to the borehole tool by way of the cable 38.

Electrical shock to an operator connecting and disconnecting connector 23 with electrical power being applied to female member 23a can be prevented by arranging the conductors in such a manner that the body of the male member 23b which would come into contact with the operator is grounded prior to electrical power being applied to the power conductors 43 and 44 and remains grounded until such time as electrical power is removed from conductors 43 and 44. This is accomplished by providing that the ground conductor 45 form the portion 23c of the outer surface of the male member 23b which would be held by the operator in connecting and disconnecting the connector 23.

Referring again to FIG. 2A, it is the specific feature of the present invention that, upon insertion of the male member 23b into the female member 23a, the leading edge 45a of conductor 45 come into contact with the leading edge 42a of conductor 42 prior to the leading edge 43a of conductor 43 coming into contact with the leading edge 41a of conductor 41. In this manner, the electrical ground connection is effected between conductors 42 and 45 prior to any of the electrical power connections being effected during the insertion process. Likewise, the electrical ground connection remains effected during the disconnecting operation until all of the power conductors on the male member have passed by all of the power conductors on the female member. This feature is accomplished by arranging the conductors along the axial direction of the two members such that the distance $a$ between the leading edges 41a and 42a of conductors 41 and 42 on the female member 23a is greater than the distance $b$ between the leading edges 43a and 45a of conductors 43 and 45 on the male member 23b.

Referring now to FIG. 3, there is illustrated a preferred embodiment of the connector of the present invention. The female member 50 is a hollow, cylindrical body that is open at one end to receive the male member 60. Female member 50 has a plurality of conductors 51–57 embedded within its inner surface, such conductors preferably being concentric about the inner surface. The male member 60 is a cylindrical member having a corresponding number of conductors 61–67 embedded within its outer surface. The conductors 51–57 and 61–67 are correspondingly spaced in the axial direction of the cylindrical members 50 and 60 respectively such that upon complete insertion of male member 60 into female member 50, conductors 51–57 will be in juxtaposition with conductors 61–67 respectively. It is to be noted that conductors 61–67 are embedded so as to be flush with the outer surface of male member 60, while conductors 51–57 are not flush with the inner surface of female member 50. A plurality of leaf contacts 70 are affixed to each of the conductors 51–57 and such contacts extend into the inner cavity of the female member 50 to such an extent that they make contact with the outer surface of the male member 60. In this manner, the conductors 51–57 are biased into contact with the conductors 61–67 respectively when the male member 60 is completely inserted into the female member 50.

The closed end of the female member 50 is provided with a terminal block 72 including a plurality of terminals, one terminal for each of the conductors 51–57. Only three such terminals, 72a, 72b, and 72c, are illustrated however. Terminal 72a, for example, is electrically connected to conductor 57 by lead wire 73. Terminal 72c is electrically connected to the conductor 51. Similarly, each of the remaining conductors 52–56 is connected by separate lead wires to terminal block 72. Terminal block 72 provides the coupling from the female member 50 to the logging cable 37.

In like manner, one end of the male member 60 is provided with a terminal block 75 including a plurality of terminals, one terminal for each of the conductors 61–67. Only three such terminals, 75a, 75b, and 75c, are illustrated however. Terminal 75a, for example, is electrically connected to conductor 62 by lead wire 76. Terminal 75b is electrically connected to the conductor 61 by lead wire 77. Similarly, each of the remaining conductors 63–67 is connected by separate lead wires to terminal block 75. Terminal block 75 provides the coupling from the male member 60 to the cable 38 leading to the sensitive elements of the borehole tool.

More particularly, electrical ground is supplied from the logging cable 37 by way of terminal 72b and ground wire 74 to conductor 51. Electrical power is supplied from the logging cable 37 to the remaining conductors 52–57, only the coupling to conductor 57 by way of terminal 72a and lead wire 73 being illustrated however.

Upon mating of female member 50 to male member 60, the outer portion of the male member 60, which is being held by the operator during such mating operation, is grounded by means of the connection between the conductor 51, the leaf contact 70, and the conductor 61 prior to any of the power connections being effected, thereby eliminating the possibility of electrical shock to the operator.

It should be understood that the foregoing disclosure relates to only a preferred embodiment of the present invention. Various modifications may be contemplated and resorted to by those skilled in the art without departing from the spirit and scope of the invention as hereinafter defined by the appended claims.

I claim:

1. A connector comprising:
   a. a first cylinder member,
   b. a second hollow, cylindrical member having one end open adapted to receive said first member,
   c. at least two conductors affixed to the outer surface of said first member and spaced from each other in the axial direction of said first member,
   d. at least two conductors affixed to the inner surface of said second member and spaced in the axial direction of said second member so as to be in juxtaposition with the conductors on said first member when said first member is positioned within said second member,
   e. means for biasing the juxtaposed conductors into contact when said first member is positioned within said second member, and
   f. the conductors on said first and second members are spaced in the axial direction along said first and second members such that the distance between the leading edges of the two conductors on said second member nearest the end adapted to receive said first member is greater than the distance between the leading edges of the conductor nearest to and the conductor farthest from the end of said first member adapted for insertion into said second member, whereby the conductor nearest the end of said second member which is adapted to receive said first member and the conductor farthest from the end of said first member which is adapted for insertion into said second member make contact prior to the remaining conductors on said first and second members making contact.

2. A connector comprising:
   a. a male member,
   b. a female member having an open end adapted to receive said male member,
   c. a male ground conductor and at least one male power conductor affixed to the outer surface of said male member, the male ground conductor being located farthest from the end of the male member adapted for insertion into said female member,
   d. a female ground conductor and at least one female power conductor affixed to the inner surface of said female member, the female ground conductor being located nearest the open end of said female member and both the female ground conductor and female power conductor being located such that they are in juxtaposition, respectively, with the male ground conductor and the male power conductor when said male member is positioned within said female member,
   e. means for biasing said male and female ground conductors into contact and for biasing said male and female power conductors into contact when said male member is positioned within said female member, and
   f. the distance between the edges of the female ground conductor and the female power conductor which are nearest the open end of said female member is greater than the distance between the edges of the male ground conductor and the male power conductor which are nearest the end of the male member adapted for insertion into said female member, whereby upon such insertion the male and female ground conductors make contact prior to the male and female power conductors making contact.

3. The connector of claim 2 wherein electrical power is connected to said female power conductor and electrical ground is connected to said female ground conductor, whereby electrical ground is applied to said male member prior to electrical power being applied to said male member.

4. The connector of claim 2 wherein both the female ground and female power conductors are concentric about the inner surface of said female member and both the male ground and male power conductors are concentric about the outer surface of said male member, whereby electrical contact between said male and female members is maintained irrespective of the rotational position of said members.

* * * * *